United States Patent
Treat et al.

(10) Patent No.: US 11,409,906 B2
(45) Date of Patent: Aug. 9, 2022

(54) PRIVACY-SECURE EDGE-ZONE DIGITAL IDENTITY COMPUTING FOR OPEN-LOOP PIXEL-STATE CONTROL

(71) Applicant: Accenture Global Solutions Limited, Dublin (IE)

(72) Inventors: David B. Treat, Ridgefield, CT (US); Tracy Ann Kuhrt, Apache Junction, AZ (US); Giuseppe Giordano, Juan-les-Pins (FR); Luca Schiatti, Juan-les-Pins (FR); Andrea Maria Milazzo, Juan-les-Pins (FR); Dominic Paolino, New York, NY (US)

(73) Assignee: Accenture Global Solutions Limited, Dublin (IE)

(*) Notice: Subject to any disclaimer, the term of this patent is extended or adjusted under 35 U.S.C. 154(b) by 158 days.

(21) Appl. No.: 16/881,989

(22) Filed: May 22, 2020

(65) Prior Publication Data

US 2021/0103676 A1    Apr. 8, 2021

Related U.S. Application Data

(60) Provisional application No. 62/910,079, filed on Oct. 3, 2019.

(51) Int. Cl.
*H04L 29/06* (2006.01)
*G06F 21/62* (2013.01)
*H04L 9/00* (2022.01)

(52) U.S. Cl.
CPC .......... *G06F 21/6245* (2013.01); *H04L 9/008* (2013.01)

(58) Field of Classification Search
CPC .................................................. G06F 12/6245
See application file for complete search history.

(56) References Cited

U.S. PATENT DOCUMENTS

| 8,468,244 B2 | 6/2013 | Redlich et al. |
| 10,410,016 B1 * | 9/2019 | Damick .............. H04L 63/0435 |

(Continued)

FOREIGN PATENT DOCUMENTS

| AU | 2012-223415 A1 | 9/2013 |
| JP | 2014-241098 A | 12/2014 |

(Continued)

OTHER PUBLICATIONS

Examination Report No. 1 issued on Australian application 2020220201 dated Dec. 22, 2020, 6 pages.

(Continued)

*Primary Examiner* — Jason K Gee
(74) *Attorney, Agent, or Firm* — Crowell & Moring LLP (57) ABSTRACT

A system includes a display control prime located within a central-zone in communication with a provisioned agent operating on an edge-zone device. The display control prime may implement prime-blind open-loop pixel-state control on the edge-zone device by executing pixel-state commands via the provisioned agent. The provisioned agent, operating within the edge-zone, may have access to un-sanitized data, which may be unavailable to the display control prime in the central-zone. The display control prime may provide conditional pixel-state commands via a pixel-state control parameter matrix. The provisioned agent may identify an operative pixel-state command from among the conditional pixel-state commands based on the un-sanitized data to which the display control prime is blind.

20 Claims, 6 Drawing Sheets

(56) References Cited

U.S. PATENT DOCUMENTS

| | | |
|---|---|---|
| 2008/0168135 A1* | 7/2008 | Redlich .............. G06F 21/6218 709/204 |
| 2010/0250497 A1 | 9/2010 | Redlich et al. |
| 2013/0019306 A1* | 1/2013 | Lagar-Cavilla ....... G06F 21/566 726/22 |
| 2014/0007193 A1 | 1/2014 | Qureshi et al. |
| 2015/0278534 A1* | 10/2015 | Thiyagarajan .......... G06F 21/84 726/28 |
| 2016/0006754 A1 | 1/2016 | Woodward et al. |
| 2016/0080403 A1 | 3/2016 | Cunningham et al. |
| 2017/0039389 A1 | 2/2017 | Smith et al. |
| 2017/0132084 A1 | 5/2017 | Yang et al. |
| 2018/0052636 A1 | 2/2018 | Frazier et al. |
| 2018/0276390 A1 | 9/2018 | Grafi |
| 2019/0020658 A1 | 1/2019 | Racz et al. |

FOREIGN PATENT DOCUMENTS

| | | |
|---|---|---|
| JP | 2017-091185 A | 5/2017 |
| WO | WO 2012-118870 A1 | 9/2012 |
| WO | WO 2019/123167 A1 | 6/2019 |
| WO | WO 2019/123447 A1 | 6/2019 |

OTHER PUBLICATIONS

Extended European Search Report of European application 20193487.4, dated Dec. 23, 2020, 10 pages.
Office Action in Japan Application No. 2020-140282, including English translation, dated Oct. 26, 2021, 7 pages.
Examination Report No. 1 for Australian application 2020230240 dated Mar. 24, 2021, 9 pages.
Examination Report No. 1 for Australian application 2020220201 dated May 19, 2021, 2 pages.
Extended European Search Report for Europe Application No. 20192308.3, dated Feb. 18, 2021, 9 pages.
Office Action in India Application No. 202044036516, dated Nov. 23, 2021, 6 pages.

* cited by examiner

PRIVACY-SECURE EDGE-ZONE DIGITAL IDENTITY COMPUTING FOR OPEN-LOOP PIXEL-STATE CONTROL

PRIORITY

This application claims priority to U.S. Provisional Patent Application No. 62/910,079, filed 3 Oct. 2019, entitled Digital Identity Edge Computing, which is incorporated herein in its entirety.

TECHNICAL FIELD

This disclosure relates to edge-zone digital identity computing.

BACKGROUND

Rapid advances in electronics and communication technologies, driven by immense customer demand, have resulted in the widespread adoption of electronic transactions, record keeping, and data sharing. As one example, electronically stored and tracked identity information has provided the underpinning for Big Data technologies and enterprises. Improvements in tracking and/or knowledge management attached to such electronically stored and tracked identity information will continue to increase the features and options available to operators engaging in data operations.

DETAILED DESCRIPTION

In an electrical and computer system, a central control system may control one or more functions on a target device. In some cases, the control decisions may be based on feedback data sent from the target device back the central control system allowing the central system to adjust control parameters to reflect information collected at the target device, for example, local sensor data, and not necessarily locally-available to the central control system. Thus, the system operates in an open-loop control state.

In an example open-loop pixel state control system, a display control prime (e.g., a central display state control system) may control pixel-states (e.g., on-off states, color states, brightness states or other physical real-world states of one or more pixels) making up at least a portion of a display on an edge-zone device (e.g., such as a mobile device within an edge-zone, as discussed below). For example, a display control prime may cause a set of pixel-states that result in an interactive display (e.g., a dialogue box, an information window, an emergency alert, a commercial offer, opportunity for automated service requests, or other interactive display) being presented.

In some cases, data on which the display control prime may base a pixel-state control determination on sensitive data (e.g., un-sanitized data, as discussed below). Accordingly, transferring the sensitive data to the display control prime may constitute a violation of privacy and/or security standards. To allow the display control prime to effect open-loop control, the display control prime may cause/provide for provisioning of an agent to run on the controlled device (or otherwise within a privacy-secure edge-zone). By providing a pixel-state control parameter matrix supporting conditional pixel-state commands, the provisioned agent may handle computations on sensitive data from within a privacy-secure edge-zone. This leaves the display control prime blind to (e.g., unable to view) the sensitive data, but still allows for prime-blind open-loop pixel-state control. Thus, the provisioned agent may handle analysis of sensitive data from within the edge-zone in the display control prime's stead.

The techniques and architectures discussed herein (including edge-zone enforcement, provisioned agents, sanitized uplink establishment, and/or control prime circuitry) provide a technical solution (e.g., digital edge computing execution and support) to a technical problem (e.g., execution of open-loop pixel-state control without sensitive data portability) thereby improving the operation of the underlying hardware. Further, because the techniques and architectures discussed herein (including edge-zone enforcement, provisioned agents, sanitized uplink establishment, and/or control prime circuitry) allow for increased compartmentalization of data, these techniques and architectures also increase the security of the computer and computing systems on which these techniques and architectures are implemented. Further, the increased privacy afforded by these techniques and architectures provide an improvement over existing market-based solutions.

In various implementations, securing data within a defined edge-zone allows for access to data (which may include sensitive private data) from which to base pixel-state commands. In various systems, similar data may be derived using various analytic tools (which may be computationally intensive, in some cases) from data available outside the edge-zone. In other words, in some cases, the data used in the pixel-state calculations may, in some cases, be computationally predicted or derived rather than obtained from the user from which it originates. However, such analytic derivation may have comparatively less accurate and efficient than a direct poll of the source of the data. Accordingly, establishment and enforcement of the edge-zone may increase the accuracy and efficiency of the underlying hardware performing the open-loop pixel-state control.

In various implementations, data sharing control may be implemented by applying homomorphic encryption (e.g., a cryptologic technique) to un-sanitized data. The homomorphic encryption may allow sharing of selected data, data details, metadata, and/or other data features without necessarily sharing un-sanitized data from which such selected data features may be derived or later recreated. The un-sanitized data may refer to data in a decrypted/unencrypted form on which pixel-control state determinations may be made. For example, un-sanitized data may include empirical data, test data, survey data, collected data, historical utilization data, sales data environmental data, industrial data, fabrication specifications, identity data, credit-worthiness data, educational credential data, government record data, or other data on which analyses may be performed.

Homomorphic encryption schemes may include a class of multiple different encryption schemes. Homomorphic encryption schemes use a homomorphic property of certain encryption algorithms, e.g., $H_m(x)$, where $H_m$ designates a homomorphic encryption algorithm. The homomorphic property provides that the sum of encrypted values is equal to the value of the encrypted sum of the values, e.g., $H_m(x)+H_m(y)=H_m(x+y)$. This homomorphic property may be used to disclose various features of the underlying data values, e.g., x and y, without disclosing x and y, using various known mathematical results from the homomorphic property. Further, because addition (e.g., an ADD operation) and multiplication (e.g., a MULT operation) may be performed on the encrypted data without decryption, processing operations, such as mathematical or modeling operations, may be performed on the data while in an encrypted state. Similarly, subtraction operations may be performed (e.g., inverse additions because: $H_m(x+y)+-H_m(y)=H_m(x)$). Accordingly, insights may be gleaned from aggregated data and/or sanitized data (e.g., privacy-preserving selected information) regarding without disclosing the un-sanitized data.

In some cases, homomorphic encryption and/or other encryption schemes may be implemented to enforce logical zones, as discussed below. In some cases, the logical zones may be implemented as secure enclaves that are local to a device (such as an edge-zone device, discussed below). The secure enclaves may offer controlled access to data for determination of actions within an open-loop pixel-state control system.

In some cases, the controlled access to the secure enclave may include access to homomorphically-encrypted data to allow manipulation and calculation without necessarily exposing private data. For example, a secure enclave may provide access to a homomorphically-encrypted version of private data, but not the underlying private data. An agent (discussed below) may execute calculation/manipulation on the homomorphically-encrypted data while encrypted. Secure local logic on the device may cause the enclave to expose an unencrypted form of the result (or execute/request a corresponding action without necessarily exposing the result) after manipulation. Thus, the underlying data remains protected within the secure enclave (and local to the device) without exposure to agent logic (including some cases where the agent itself is localized).

Additionally or alternatively, the controlled access to the secure enclave may include access to data with types of encryption that may not necessarily allow operations on the data while in an encrypted form. The enclaves may be the logical zones (which are also physically localized to specific locations on the mobile device) in which private data may be decrypted. Outside the enclave, only encrypted forms of the data may be allowed. The enclaves may be data specific, application specific, or specific to neither. For example, a particular enclave may house specified private data (photos, contacts, demographic data, financial data, and/or other private data) and mediate access to that data for applications (in some cases all applications) accessing the specified data. In some cases, enclaves may house various unspecified private data for interaction with a specific application or applications. In some cases, the enclave may mediate interactions among unspecified private data and unspecified applications.

To maintain data privacy and security, an edge-zone may be defined for an open-loop pixel-state control system. The edge-zone may be protected such that data traveling out of the edge-zone (e.g., on uplinks to the display control prime) is sanitized. The edge-zone may be logically- and/or physically-localized.

Logical localization may be defined by a logical perimeter (e.g., various physical storage and process locations that enforce the encryption requirements of the logically-localized edge-zone) which may not necessarily be physically localized. In other words, storage and processing locations within a logically-localized edge-zone may be physically distributed (in some cases, co-located (at least in part) with display control prime hardware) but logically maintain the edge-zone through encryption parameters. For example, homomorphic encryption may be a condition of an example logically-localized edge-zone, but the hardware hosting processing and storage locations with example edge-zone may be physically distributed.

Physical localization may be defined by one or more physical perimeters. For example, specific hardware devices may be wholly (or partially) within the edge-zone. Thus, processing or storage on those devices would be in the edge-zone.

In some cases, an edge-zone may use physical and logical localization. For example, a physical perimeter and a logical perimeter may be defined for an edge-zone. Storage and/or processing may be in the edge-zone if it occurs within at least one of the perimeters. In some cases, both physical and logical localization may be used in tandem. Accordingly, storage and/or processing may be in the edge-zone if it occurs within both of the perimeters.

An edge-zone device may include a device (or a portion of a device) hosting storage and/or processing within an edge-zone. An edge-zone device may include a display with one or more pixels subject to pixel-state control by the display control prime.

A central-zone may include one or more regions outside the edge-zone including hardware implementing the display control prime.

Figure 1:
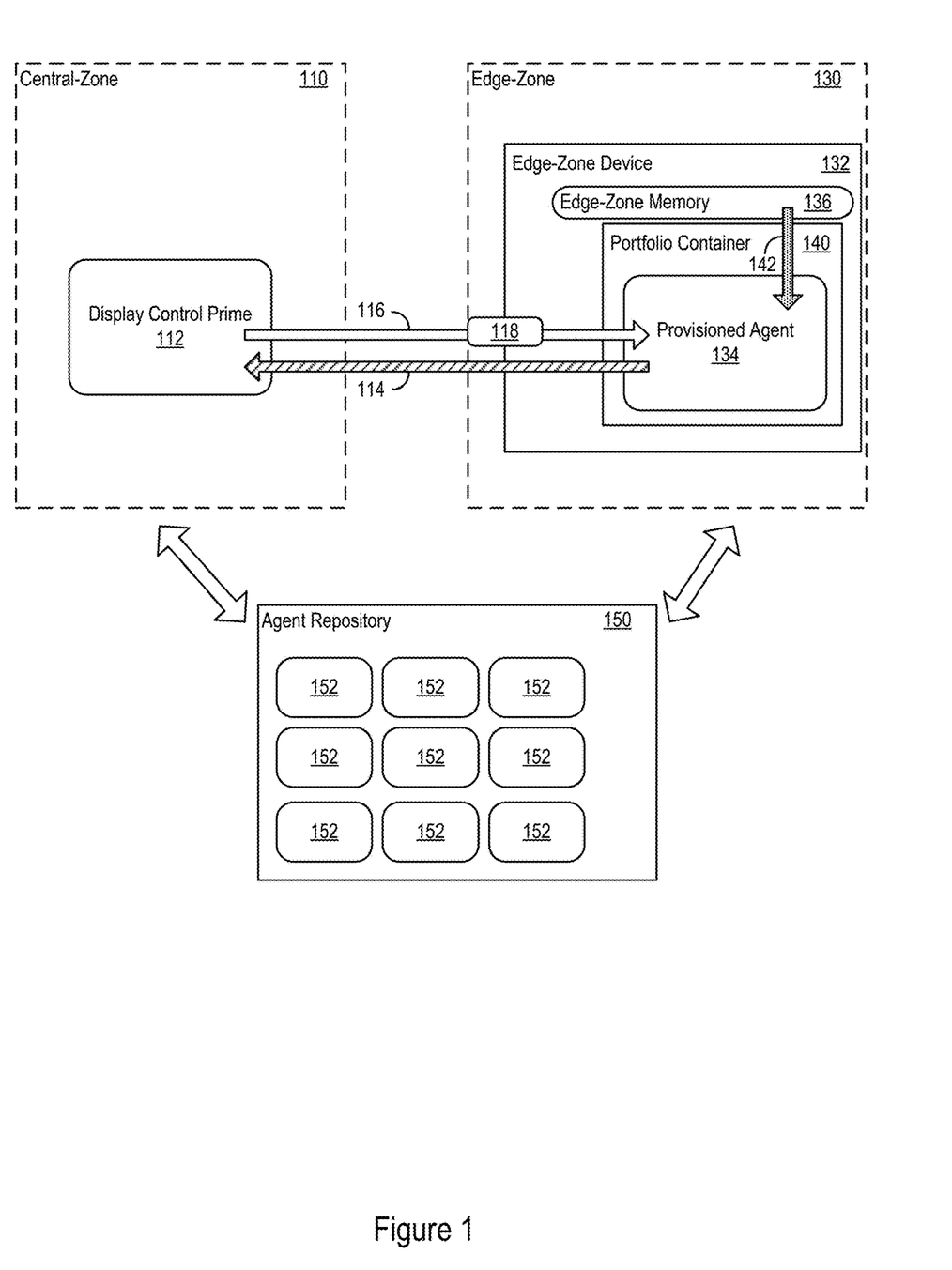
FIG. 1 shows an example pixel-state control environment.

FIG. 1 shows an example pixel-state control environment 100. In the example pixel-state control environment 100, a display control prime 112 within a central-zone 110 has established a sanitized uplink 114 with an edge-zone provisioned agent 134 on an edge-zone device 132 in a privacy-secure edge-zone 130. In this illustrative example, the display control prime has also established an edge-support downlink 116. The display control prime 112 has provided the provisioned agent with a pixel-state control parameter matrix 118. The provisioned agent is further located within a portfolio container 140 on the edge-zone device 132. The portfolio container 140 may include a quarantined space for one or more agents (potentially controlled by multiple different prime systems). The portfolio container 140 may include an un-sanitized data import channel 142 for moving un-sanitized data from edge-zone memory 136 into the portfolio container and on to the agent(s) therein.

In some cases, prior to provisioning, pre-provisioned agents may be maintained in agent repository 150. The agent repository 150 may include multiple different pre-provisioned agents 152 corresponding to different display control prime systems (e.g., and different enterprises). Accordingly, the agent repository may be maintained by a third party controlling neither the edge-zone device 132 nor the display control prime 112. In some cases, the agent repository may include a search function and/or a virtual "app store" type storefront where users may find and install agents for their edge-zone devices. In some cases, the agents may be pre-provisioned with the repository with the pixel-state control parameter matrix 118, Referring now to FIG. 2 while continuing to refer to FIG. 1, FIG. 2 shows example control prime logic (CPL) 200 which may define the operation of hardware executing as control prime circuitry.

The CPL 200 may provide a pixel-state control parameter matrix 118 to the provisioned agent 134 (202). The pixel-state control parameter matrix may include a data structure (such as a table, self-executing code, machine-learning code, or other data structure) that may accept input data (e.g., un-sanitized data available within the privacy secure edge-zone) and to identify one or more conditional pixel-state commands included within the pixel-state control parameter matrix. The conditional pixel-state commands may include details of display content that may be presented on a display of the edge-zone device (e.g., thereby controlling the pixel-states of the device). The conditionality of the commands informs the agent the conditions under which a particular conditional pixel-state command is in force (e.g., is an operative pixel-state command). In other words, the display control prime sends the conditional pixel-state commands as a group in the pixel-state control parameter matrix 118, but the display control prime is blind to the un-sanitized data on which the conditionality of the commands rests. Therefore, the agent determines which of the commands from the display control prime is in effect, by applying the un-sanitized data to the pixel-state control parameter matrix 118 and determining a conditional pixel-state command that matches the conditions.

The CPL 200 may receive sanitized feedback from the provisioned agent 134 over the sanitized uplink (204). The reception of this feedback may be dependent on the execution of provisioned agent logic (PAL) 250 by the agent. Accordingly, the execution of the PAL 250 by the agent may not necessarily be affirmatively performed by (or under the direct control of) the CPL 200 (or any entity controlling the CPL 200). Rather the execution of the PAL 250 performed by the provisioned agent describes the specific conditions under which sanitized feedback may be received by the CPL 200 over the sanitized uplink.

Figure 2:
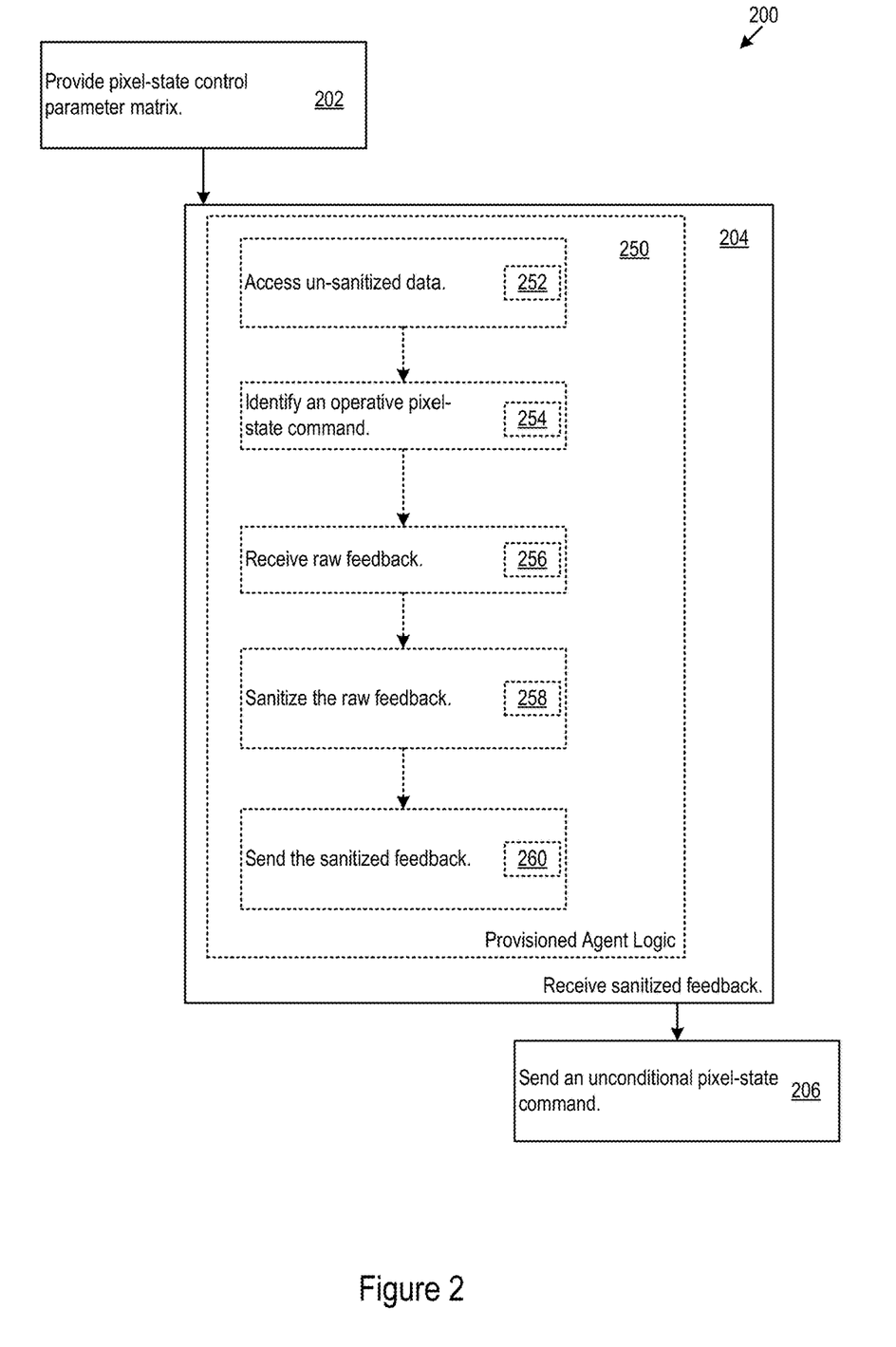
FIG. 2 shows example control prime logic.

Referring now to the PAL 250 of FIG. 2, prior to sending the sanitized feedback to the CPL 200, the PAL 250 may access un-sanitized data while the provisioned agent 134 is localized in the privacy-secure edge-zone (252). In some cases, the provisioned agent may be located within a portfolio container 140. To access the un-sanitized data from within the portfolio container 140, the provisioned agent 134 may request import of the un-sanitized data over the import channel 142.

The portfolio container 140 may enforce import rules. For example, specific agents within the portfolio container may have specifically-defined access to specific types of un-sanitized data. The portfolio container 140 (e.g., via the import channel 142) may inspect data incoming into the portfolio container (e.g., to ensure the import rules are followed). For example, an agent maintaining pixel-stat displays related to automated hotel bookings may have access to location information from the edge-zone device, but be barred from requesting educational credential information.

In some cases, provisioned agents may comply with a pre-access condition be accessing un-sanitized data. For example, the import channel 142 may constrain access to a particular type of un-sanitized data to agents that have implemented a pre-determined level of encryption protection. In an example, the import channel 142 may enforce a sanitization criterion on data bound for the sanitized uplink. In the example, the import channel may force the agent to comply with a new or stricter sanitization scheme (e.g. further constraining the type data that may be sent to the display control prime) before agreeing to send additional un-sanitized data.

In some cases, provisioned agents may complete a remunerative transaction to a user of the edge-zone device before gaining access to un-sanitized data. In some cases, such rules or transactions may transform un-sanitized date into sanitized data for a provisioned agent or group of agents. However, the transformation may be constrained. For example, the transformed un-sanitized data may remain un-sanitized data for agents other than a specific agent or group of agents for which the transformation applies.

Based on the accessed un-sanitized data and the pixel-state control parameter matrix 118, the PAL 250 may identify an operative pixel-state command from among the conditional pixel-state commands in the pixel-state control parameter matrix 118 (254). Based on the operative pixel-state command, the PAL 250 may cause a change to a pixel-state of the edge-zone device 132. For example, the PAL 250 may cause a change to the physical state of pixels on the edge-zone device to display specific content on the display or a portion of the display.

Figure 4:
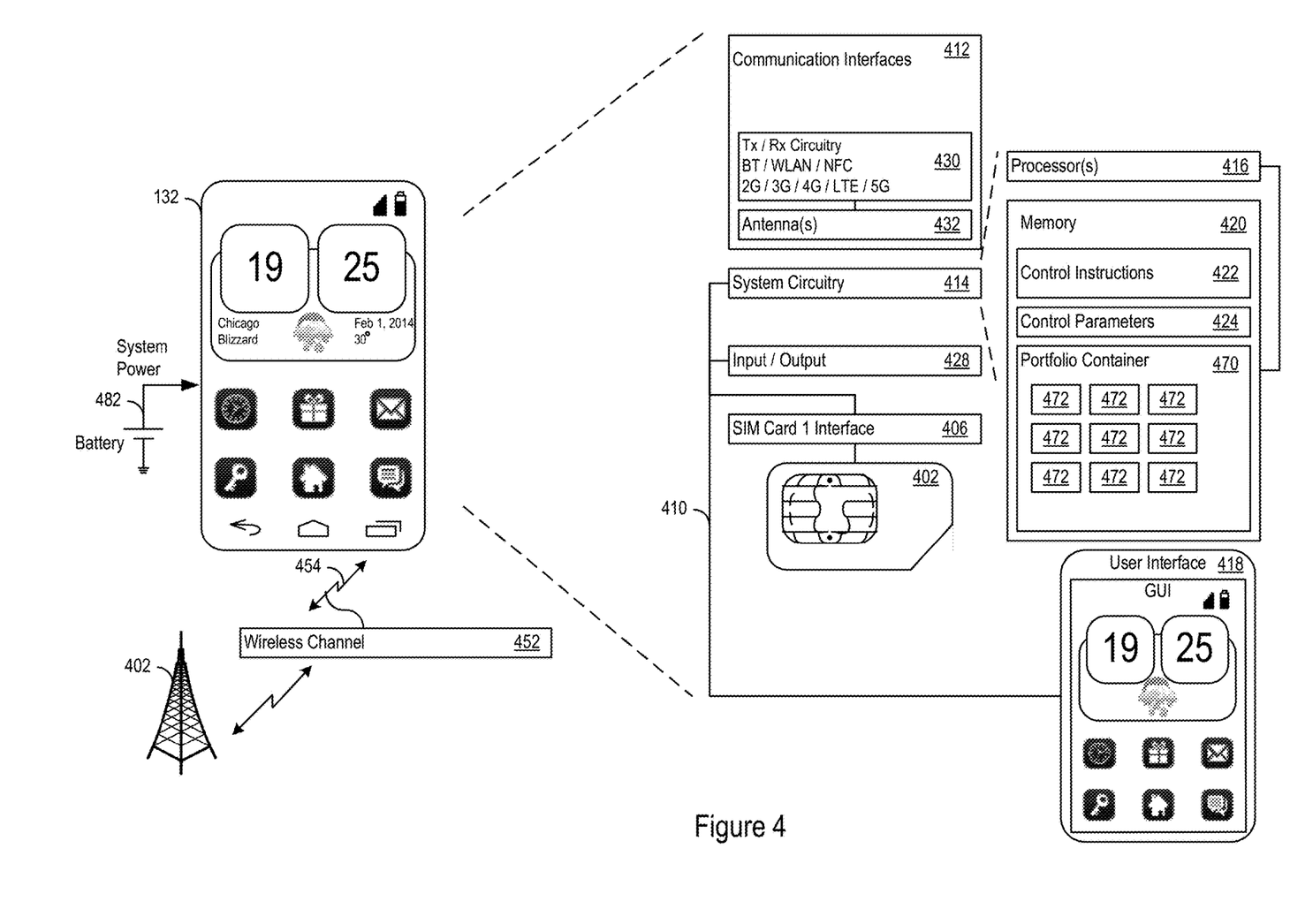
FIG. 4 shows an example edge-zone device.

Responsive to the changed pixel-state, the PAL 250 may receive raw feedback from a user interface of the edge-zone device (256). The raw feedback may include user taps or button presses or other interface device (e.g., such as those of user interface 418, discussed below). Further, the raw feedback may include or be connected to un-sanitized data. Accordingly, PAL 250 may sanitize (e.g., remove un-sanitized data) the raw feedback (258) before sending sanitized feedback to the CPL 200 over the sanitized uplink (260).

Referring again to the CPL 200 of FIG. 2, the CPL 200 may send an unconditional pixel-state command based on the sanitized feedback (206). This unconditional pixel-state command may be analogous (at least in part) to corrective adjustments based on a feedback loop in open-loop control systems. For example, the unconditional pixel-state command may provide an adjustment to a previous display leading to negative sanitized feedback (e.g., updating the display with an updated more attractive promotion). In an example, the unconditional pixel-state command may include a command to display a confirmation or acknowledgment after positive sanitized feedback is received.

Figure 3:
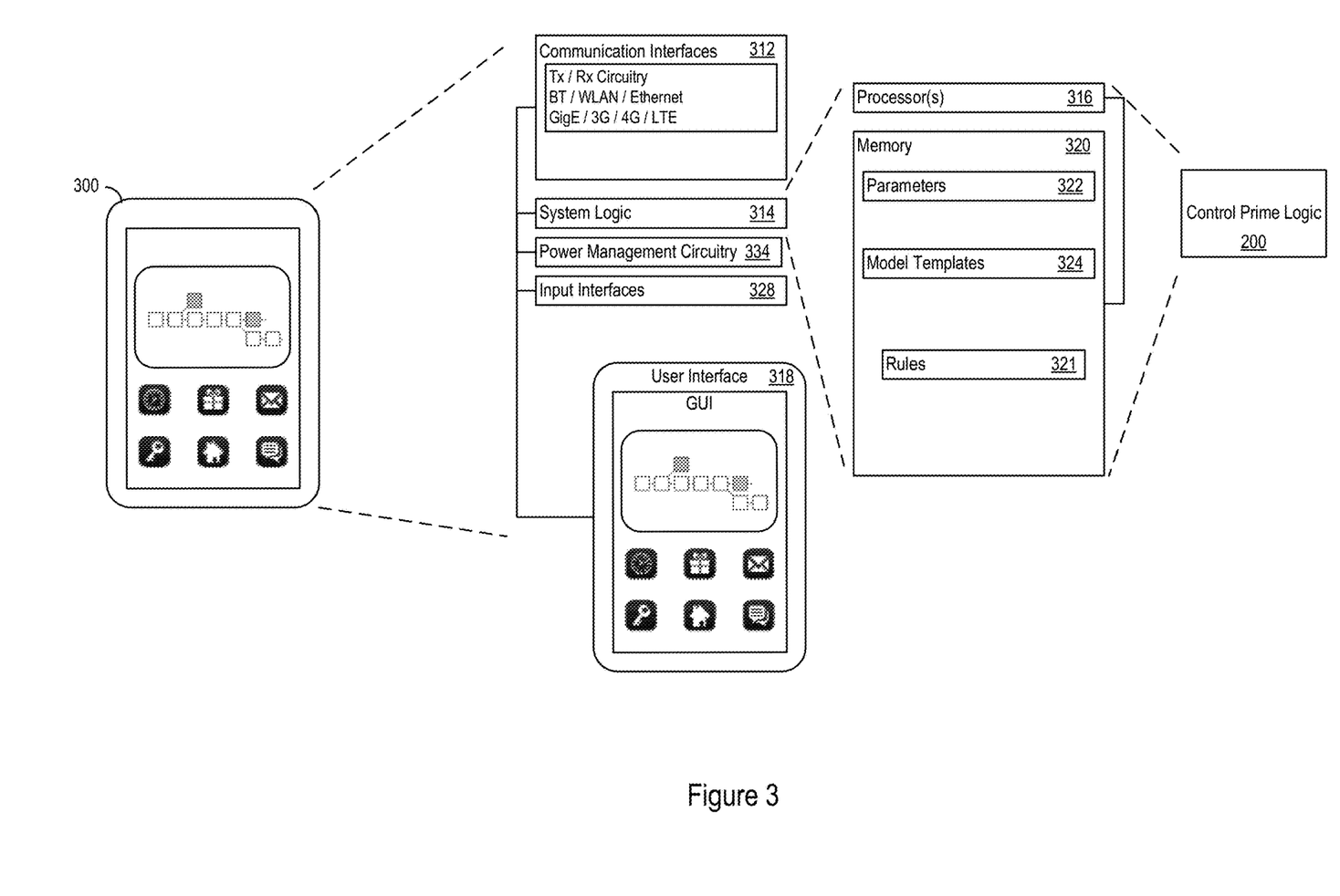
FIG. 3 shows an example control prime execution environment.

FIG. 3 shows an example control prime execution environment (CPEE) 300 which may be implemented as control prime circuitry. The CPEE 300 may include system logic 314 to support tasks described in the disclosure, such as agent control and communication. The system logic 314 may include processors 316, memory 320, and/or other circuitry, which may be used to implement CPL 200, which may provide software support to implement the various tasks performed by the CPL 200 (e.g., to transform the CPEE 300 (at least in part) into specialized control prime circuitry). In various implementations, the CPEE 300 may include a mobile device.

The memory 320 may be used to store parameters 322 and/or model templates 324 used in the agent control and communication. The memory 320 may further store rules 321 that may facilitate agent control and communication and/or the execution of other tasks.

The memory 320 may further include applications and structures, for example, coded objects, templates, or one or more other data structures to facilitate such as agent control and communication and/or the execution of other tasks. The CPEE 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. The communication interface 312 may support communication, e.g., through the communication layer as network interface circuitry, with data sources or resources used to facilitate, such as agent control and communication and/or the execution of other tasks. Additionally or alternatively, the communication interface 312 may support secure information exchanges, such as secure socket layer (SSL) or public-key encryption-based protocols for sending and receiving sanitized and/or un-sanitized data. The CPEE 300 may include power management circuitry 334 and one or more input interfaces 328.

The CPEE 300 may also include a user interface 318 that may include man-machine interfaces and/or graphical user interfaces (GUI). The GUI may be used to present interfaces and/or options to facilitate agent and/or frontend management and/or the execution of other tasks.

FIG. 4 shows an example edge-zone device 132. The example edge-zone device 132 may communicate with a basestation 402 over a wireless channel 454. In this example, the example edge-zone device 132 supports one or more Subscriber Identity Modules (SIMs), such as the SIM1 402. Electrical and physical interface 406 connects SIM1 202 to the rest of the user equipment hardware, for example, through the system bus 410.

The example edge-zone device 132 includes communication interfaces 412, system logic 414, and a user interface 418. The system logic 414 may include circuitry and/or hardware, which may host combinations of software, firmware, or other executable code. The system logic 414 may be implemented, for example, with one or more systems on a chip (SoC), application specific integrated circuits (ASIC), discrete analog and digital circuits, and other circuitry. The system logic 414 is part of the implementation of any desired functionality in the example edge-zone device 132. In that regard, the system logic 414 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 418. The user interface 418 and the inputs 428 may include a graphical user interface, touch sensitive display, haptic feedback or other haptic output, voice or facial recognition inputs, buttons, switches, speakers and other user interface elements. Additional examples of the inputs 428 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 414 may include one or more processors 416 and memories 420. The memory 420 stores, for example, control instructions 422 that the processor 416 executes to carry out desired functionality for the example edge-zone device 132. The control parameters 424 provide and specify configuration and operating options for the control instructions 422. Further, the memory 420 may include a quarantined portfolio container 470, which may host various provisioned agents 472. The memory 420 may also store any BT, WiFi, 3G, 4G, 5G or other data that the edge-zone device 132 will send, or has received, through the communication interfaces 412.

In various implementations, the system power may be supplied by a power storage device, such as a battery 482.

In the communication interfaces 412, Radio Frequency (RF) transmit (Tx) and receive (Rx) circuitry 430 handles transmission and reception of signals through one or more antennas 432. The communication interface 412 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 412 may include transceivers that support transmission and reception under the 2G, 3G, BT, WiFi, Universal Mobile Telecommunications System (UMTS), High Speed Packet Access (HSPA)+, and 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

EXAMPLE IMPLEMENTATIONS

The following example implementations are described to be illustrative of various ones of the principles discussed above. However, the following examples are not intended to be limiting, but rather, in some cases, specific examples to aid in the illustration of the above described techniques and architectures. Various features of the following example implementations may be present in other implementations and absent in yet other implementations. The features of the following example implementations may be combined in various groupings in accord with the techniques and architectures described above.

Figure 5:
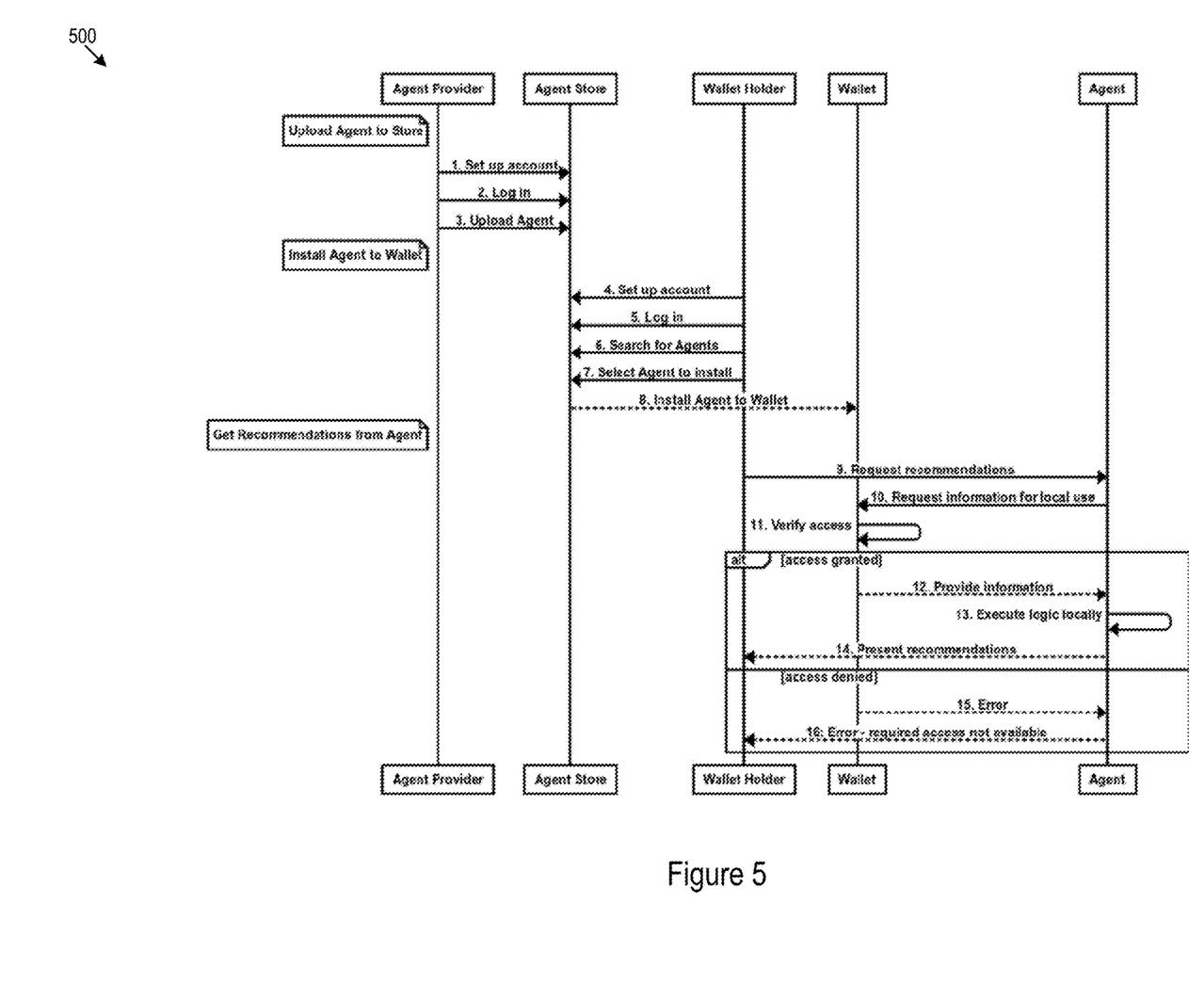
FIG. 5 shows an example ladder diagram for an example system with a physically-localized edge-zone.

FIG. 5 shows an example ladder diagram 500 for an example system with a physically-localized edge-zone implementing various one of the techniques and architectures discussed above. In the example system, the agent provider may correspond to the display control prime, the agent store may correspond to the agent repository, the wallet may correspond to the portfolio container, and the "alt" box may define the physically-localized edge-zone. The "recommendations" may be displayed using pixel-state commands.

Figure 6:
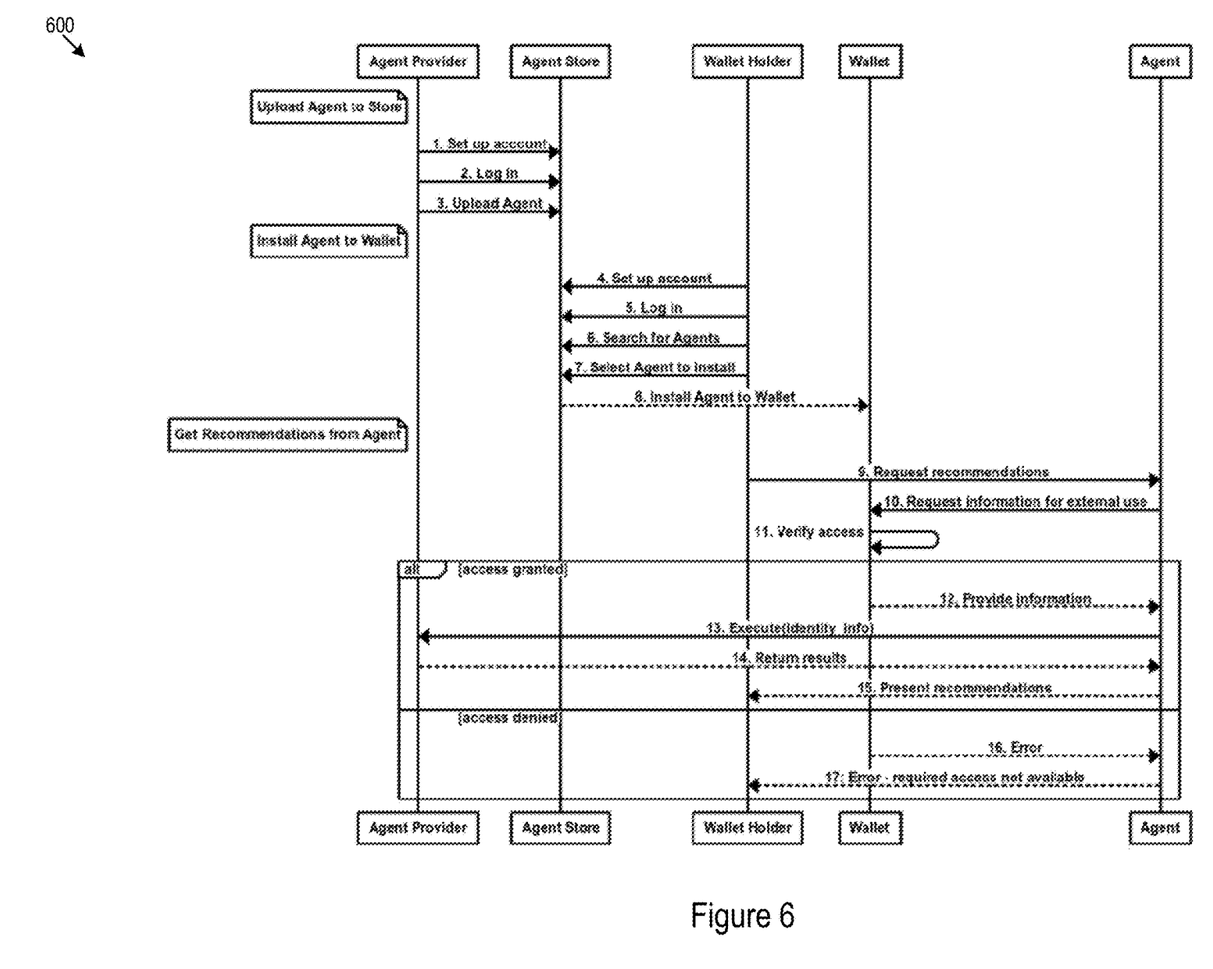
FIG. 6 shows an example ladder diagram for an example system with a logically-localized edge-zone.

FIG. 6 shows an example ladder diagram 600 for another example system with a logically-localized edge-zone implementing various one of the techniques and architectures discussed above. In the example system, the agent provider may correspond to the display control prime, the agent store may correspond to the agent repository, the wallet may correspond to the portfolio container, and the "alt" box may define the logically-localized edge-zone. The "recommendations" may be displayed using pixel-state commands.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations may use the techniques and architectures described above.

E1. In an example, a system includes: network interface circuitry configured to establish: a sanitized uplink between a privacy-secure-edge-zone provisioned agent and a central-zone-provisioned display control prime, the sanitized uplink configured to prevent upstream transport of un-sanitized data; and control prime circuitry configured to execute a prime-blind open-loop pixel-state control of an edge-zone device by: providing a pixel-state control parameter matrix from the display control prime to the provisioned agent, the pixel-state control parameter matrix, the pixel-state control parameter matrix including multiple command-descriptors configured to support conditional prime command execution based on un-sanitized data, the display control prime being blind to the un-sanitized data; responsive to: the provisioned agent accessing the un-sanitized data while localized in the privacy-secure edge-zone; the provisioned agent determining, based on the pixel-state control parameter matrix and the un-sanitized data, an operative pixel-state command from among the command-descriptors; the provisioned agent causing a change to a pixel-state of the edge-zone device based on the operative pixel-state command; the provisioned agent receiving raw feedback input from a user interface of the edge-zone device responsive to the changed pixel-state; and the provisioned agent sanitizing the raw feedback input to generate sanitized feedback: receiving, at the display control prime in the central-zone, the sanitized feedback input from the provisioned agent via the sanitized uplink; and responsive to the sanitized feedback sending an unconditional pixel-state command configured to generate an acknowledgment pixel-state indicative of reception of the sanitized feedback.

E2. The system of example E1, where the operative pixel-state command is configured to generate an interactive interface on a display of the edge-zone device.

E3. The system of example E1 or E2, where the control prime circuitry is configured to pre-provision the provisioned agent to a third-party-maintained agent repository to support provisioning on the edge-zone device.

E4. The system of example E3 or either of examples E1 or E2, where the control prime circuitry is configured to provide the pixel-state control parameter matrix by embedding the pixel-state control parameter matrix in the provisioned agent during pre-provisioning.

E5. The system of any of examples E1-E3, where the network interface circuitry is further configured to establish an edge-support downlink between the provisioned agent and the display control prime.

E6. The system of example E5 or any of examples E1-E4, where the control prime circuitry is configured to provide the pixel-state control parameter matrix by sending the pixel-state control parameter matrix to the provisioned agent via the edge-support downlink.

E7. The system of any of examples E1-E5, where the provisioned agent is configured to comply with a pre-access condition before accessing the un-sanitized data.

E8. The system of any of examples E1-E6, where the provisioned agent is quarantined to a portfolio container while in the edge-zone.

E9. The system of example E8 or any of examples E1-7, where the portfolio container is configured to enforce a sanitization criterion on the sanitized uplink.

E10. The system of example E8 or E9 or any of examples E1-E7, where the portfolio container is configured to inspect incoming data on an import channel from memory controlled by the edge-zone device into the portfolio container.

E11. The system of any of examples E1-E10, where the edge-zone includes a physically-localized region.

E12. The system of any of examples E1-E11, where the edge-zone includes a logically localized region.

E13. In an example, a method includes: at network interface circuitry, establishing a sanitized uplink between a privacy-secure-edge-zone provisioned agent and a central-zone-provisioned display control prime, the sanitized uplink configured to prevent upstream transport of un-sanitized data; and at control prime circuitry, executing a prime-blind open-loop pixel-state control of an edge-zone device by: providing a pixel-state control parameter matrix from the display control prime to the provisioned agent, the pixel-state control parameter matrix, the pixel-state control parameter matrix including multiple command-descriptors configured to support conditional prime command execution based on un-sanitized data, the display control prime being blind to the un-sanitized data; responsive to: the provisioned agent accessing the un-sanitized data while localized in the privacy-secure edge-zone; the provisioned agent determining, based on the pixel-state control parameter matrix and the un-sanitized data, an operative pixel-state command from among the command-descriptors; the provisioned agent causing a change to a pixel-state of the edge-zone device based on the operative pixel-state command; the provisioned agent receiving raw feedback input from a user interface of the edge-zone device responsive to the changed pixel-state; and the provisioned agent sanitizing the raw feedback input to generate sanitized feedback: receiving, at the display control prime in the central-zone, the sanitized feedback input from the provisioned agent via the sanitized uplink; and responsive to the sanitized feedback sending an unconditional pixel-state command configured to generate an acknowledgment pixel-state indicative of reception of the sanitized feedback.

E14. The method of example E13, where the operative pixel-state command is configured to generate an interactive interface on a display of the edge-zone device.

E15. The method of example E13 or E14, further including pre-provisioning the provisioned agent to a third-party-maintained agent repository to support provisioning on the edge-zone device.

E16. The method of example E15 of either of examples E13 or E14, where providing the pixel-state control parameter matrix includes embedding the pixel-state control parameter matrix in the provisioned agent during pre-provisioning.

E17. In an example, a product includes: machine-readable media other than a transitory signal; and instructions stored on the machine-readable media, the instructions configured to, when executed, cause a machine to: at network interface circuitry, establish a sanitized uplink between a privacy-secure-edge-zone provisioned agent and a central-zone-provisioned display control prime, the sanitized uplink configured to prevent upstream transport of un-sanitized data; and at control prime circuitry, execute a prime-blind open-loop pixel-state control of an edge-zone device by: providing a pixel-state control parameter matrix from the display control prime to the provisioned agent, the pixel-state control parameter matrix, the pixel-state control parameter matrix including multiple command-descriptors configured to support conditional prime command execution based on un-sanitized data, the display control prime being blind to the un-sanitized data; responsive to: the provisioned agent accessing the un-sanitized data while localized in the privacy-secure edge-zone; the provisioned agent determining, based on the pixel-state control parameter matrix and the un-sanitized data, an operative pixel-state command from among the command-descriptors; the provisioned agent causing a change to a pixel-state of the edge-zone device based on the operative pixel-state command; the provisioned agent receiving raw feedback input from a user interface of the edge-zone device responsive to the changed pixel-state; and the provisioned agent sanitizing the raw feedback input to generate sanitized feedback: receiving, at the display control prime in the central-zone, the sanitized feedback input from the provisioned agent via the sanitized uplink; and responsive to the sanitized feedback sending an unconditional pixel-state command configured to generate an acknowledgment pixel-state indicative of reception of the sanitized feedback.

E18. The product of example E17, where the provisioned agent is quarantined to a portfolio container while in the edge-zone.

E19. The product of example E18 or example E17, where the portfolio container is configured to enforce a sanitization criterion on the sanitized uplink.

E20. The product of either of examples E18 or E19 or example E17, where the portfolio container is configured to inspect incoming data on an import channel from memory controlled by the edge-zone device into the portfolio container.

Various implementations have been specifically described. However, many other implementations are also possible.

Headings and/or subheadings used herein are intended only to aid the reader with understanding described implementations.

What is claimed is:

1. A system including:
network interface circuitry configured to establish: a sanitized uplink between a privacy-secure-edge-zone provisioned agent and a central-zone-provisioned display control prime, the sanitized uplink configured to prevent upstream transport of un-sanitized data; and
control prime circuitry configured to execute a prime-blind open-loop pixel-state control of an edge-zone device by:
providing a pixel-state control parameter matrix from the display control prime to the provisioned agent, the pixel-state control parameter matrix including multiple command-descriptors configured to support conditional prime command execution based on un-sanitized data, the display control prime being blind to the un-sanitized data;
responsive to:
the provisioned agent accessing the un-sanitized data while localized in the privacy-secure edge-zone;
the provisioned agent determining, based on the pixel-state control parameter matrix and the un-sanitized data, an operative pixel-state command from among the command-descriptors;
the provisioned agent causing a change to a pixel-state of the edge-zone device based on the operative pixel-state command;
the provisioned agent receiving raw feedback input from a user interface of the edge-zone device responsive to the changed pixel-state; and
the provisioned agent sanitizing the raw feedback input to generate sanitized feedback:
receiving, at the display control prime in the central-zone, the sanitized feedback input from the provisioned agent via the sanitized uplink; and
responsive to the sanitized feedback, sending an unconditional pixel-state command configured to generate an acknowledgment pixel-state indicative of reception of the sanitized feedback.

2. The system of claim 1, where the operative pixel-state command is configured to generate an interactive interface on a display of the edge-zone device.

3. The system of claim 1, where the control prime circuitry is configured to pre-provision the provisioned agent to a third-party-maintained agent repository to support provisioning on the edge-zone device.

4. The system of claim 3, where the control prime circuitry is configured to provide the pixel-state control parameter matrix by embedding the pixel-state control parameter matrix in the provisioned agent during pre-provisioning.

5. The system of claim 1, where the network interface circuitry is further configured to establish an edge-support downlink between the provisioned agent and the display control prime.

6. The system of claim 5, where the control prime circuitry is configured to provide the pixel-state control parameter matrix by sending the pixel-state control parameter matrix to the provisioned agent via the edge-support downlink.

7. The system of claim 1, where the provisioned agent is configured to comply with a pre-access condition before accessing the un-sanitized data.

8. The system of claim 1, where the provisioned agent is quarantined to a portfolio container while in the edge-zone.

9. The system of claim 8, where the portfolio container is configured to enforce a sanitization criterion on the sanitized uplink.

10. The system of claim 8, where the portfolio container is configured to inspect incoming data on an import channel from memory controlled by the edge-zone device into the portfolio container.

11. The system of claim 1, where the edge-zone includes a physically-localized region.

12. The system of claim 1, where the edge-zone includes a logically localized region.

13. A method including:
at network interface circuitry, establishing a sanitized uplink between a privacy-secure-edge-zone provisioned agent and a central-zone-provisioned display control prime, the sanitized uplink configured to prevent upstream transport of un-sanitized data; and
at control prime circuitry, executing a prime-blind open-loop pixel-state control of an edge-zone device by:
providing a pixel-state control parameter matrix from the display control prime to the provisioned agent, the pixel-state control parameter matrix including multiple command-descriptors configured to support conditional prime command execution based on un-sanitized data, the display control prime being blind to the un-sanitized data;
responsive to:
the provisioned agent accessing the un-sanitized data while localized in the privacy-secure edge-zone;
the provisioned agent determining, based on the pixel-state control parameter matrix and the un-sanitized data, an operative pixel-state command from among the command-descriptors;
the provisioned agent causing a change to a pixel-state of the edge-zone device based on the operative pixel-state command;
the provisioned agent receiving raw feedback input from a user interface of the edge-zone device responsive to the changed pixel-state; and
the provisioned agent sanitizing the raw feedback input to generate sanitized feedback:
receiving, at the display control prime in the central-zone, the sanitized feedback input from the provisioned agent via the sanitized uplink; and
responsive to the sanitized feedback, sending an unconditional pixel-state command configured to generate an acknowledgment pixel-state indicative of reception of the sanitized feedback.

14. The method of claim 13, where the operative pixel-state command is configured to generate an interactive interface on a display of the edge-zone device.

15. The method of claim 13, further including pre-provisioning the provisioned agent to a third-party-maintained agent repository to support provisioning on the edge-zone device.

16. The method of claim 15, where providing the pixel-state control parameter matrix includes embedding the pixel-state control parameter matrix in the provisioned agent during pre-provisioning.

17. A product including:
machine-readable media other than a transitory signal; and
instructions stored on the machine-readable media, the instructions configured to, when executed, cause a machine to:
at network interface circuitry, establish a sanitized uplink between a privacy-secure-edge-zone provisioned agent and a central-zone-provisioned display control prime, the sanitized uplink configured to prevent upstream transport of un-sanitized data; and
at control prime circuitry, execute a prime-blind open-loop pixel-state control of an edge-zone device by:
providing a pixel-state control parameter matrix from the display control prime to the provisioned agent, the pixel-state control parameter matrix including multiple command-descriptors configured to support conditional prime command execution based on un-sanitized data, the display control prime being blind to the un-sanitized data;
responsive to:
the provisioned agent accessing the un-sanitized data while localized in the privacy-secure edge-zone;
the provisioned agent determining, based on the pixel-state control parameter matrix and the un-sanitized data, an operative pixel-state command from among the command-descriptors;
the provisioned agent causing a change to a pixel-state of the edge-zone device based on the operative pixel-state command;
the provisioned agent receiving raw feedback input from a user interface of the edge-zone device responsive to the changed pixel-state; and
the provisioned agent sanitizing the raw feedback input to generate sanitized feedback:
receiving, at the display control prime in the central-zone, the sanitized feedback input from the provisioned agent via the sanitized uplink; and
responsive to the sanitized feedback, sending an unconditional pixel-state command configured to generate an acknowledgment pixel-state indicative of reception of the sanitized feedback.

18. The product of claim 17, where the provisioned agent is quarantined to a portfolio container while in the edge-zone.

19. The product of claim 18, where the portfolio container is configured to enforce a sanitization criterion on the sanitized uplink.

20. The product of claim 18, where the portfolio container is configured to inspect incoming data on an import channel from memory controlled by the edge-zone device into the portfolio container.

* * * * *